United States Patent [19]
Ustuner et al.

[11] Patent Number: 6,110,115
[45] Date of Patent: Aug. 29, 2000

[54] MEDICAL DIAGNOSTIC ULTRASONIC IMAGING SYSTEM AND METHOD

[75] Inventors: Kutay F. Ustuner, Mountain View, Calif.; Matthew O'Donnell, Ann Arbor, Mich.

[73] Assignee: Acuson Corporation, Mountain View, Calif.

[21] Appl. No.: 09/213,996

[22] Filed: Dec. 17, 1998

[51] Int. Cl.[7] .................................................. A61B 8/00
[52] U.S. Cl. .......................................................... 600/443
[58] Field of Search .................................. 600/443, 447; 73/625–626

[56] References Cited

U.S. PATENT DOCUMENTS

| | | | |
|---|---|---|---|
| 4,881,549 | 11/1989 | Rhyne | 600/443 |
| 5,409,007 | 4/1995 | Saunders et al. | 600/447 |
| 5,531,117 | 7/1996 | Fortes | 600/447 |

*Primary Examiner*—Francis J. Jaworski
*Attorney, Agent, or Firm*—Brinks Hofer Gilson & Lione

[57] ABSTRACT

An ultrasonic imaging system and method provide whitening using a two dimensional pre-detection filter followed by low pass filtering using a two dimensional post-detection filter to reduce speckle variance and enhance spatial resolution of the resulting image.

23 Claims, 5 Drawing Sheets

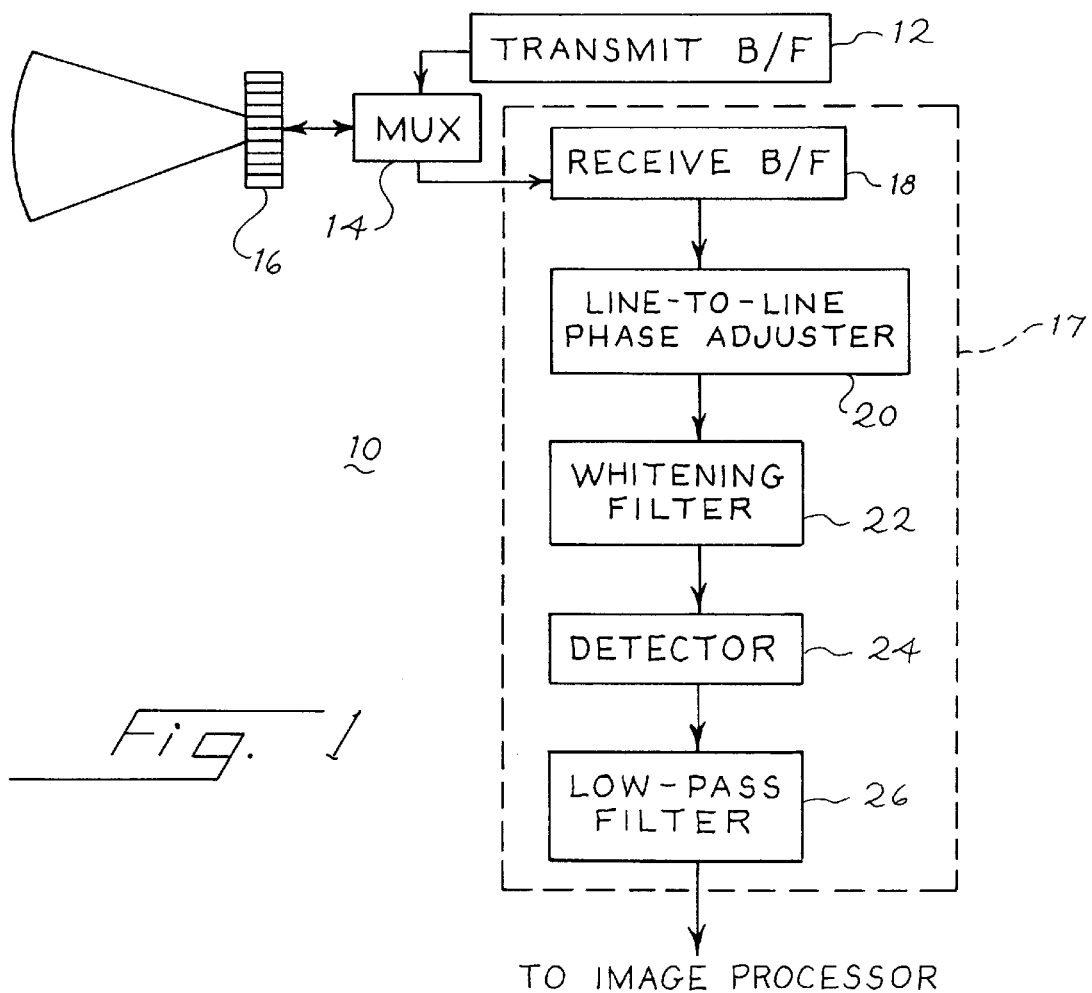

MEDICAL DIAGNOSTIC ULTRASONIC IMAGING SYSTEM AND METHOD

BACKGROUND

The present invention relates to medical diagnostic ultrasonic imaging systems, and in particular to improved signal paths that improve resolution and reduce speckle variance in such imaging systems.

Speckle is generated by interference from waves emanating from multiple scatterers within the sample volume (resolution cell) of an ultrasound imaging system. For log-compressed images, speckle acts as additive noise that interferes with the detectability of small and/or subtle lesions that only have a small echogenicity difference as compared to adjacent tissues. For this reason, speckle variance reduction is critical to enhancing detectability of tissue echogenicity differences.

Several speckle reduction techniques are widely used in the medical ultrasound field. Most employ some form of spatial, temporal, or frequency compounding. For example, post-detection video filtering, persistence filtering of spatially uncorrelated images, and similar methods are used. These methods cause a loss of spatial or temporal resolution, or both.

SUMMARY

The present invention is defined by the following claims, and nothing in this section should be taken as a limitation on those claims. By way of introduction, the ultrasonic imaging systems described below include a signal path that reduces speckle while preserving or even improving detail resolution, depending on the amount of speckle reduction desired. The signal path includes a whitening filter such as a two-dimensional whitening filter positioned upstream of the detector, and a low pass filter such as a two-dimensional low pass filter positioned downstream of the detector. The disclosed signal path thus provides pre-detection spatial frequency whitening followed by post-detection spatial smoothing.

BRIEF DESCRIPTION OF THE DRAWINGS

FIG. 1 is a block diagram of an ultrasonic imaging system that incorporates a preferred embodiment of this invention.

FIGS. 2, 3, 4 and 5 are block diagrams of filters suitable for use in the embodiment of FIG. 1.

DETAILED DESCRIPTION OF THE PRESENTLY PREFERRED EMBODIMENTS

Figure 6:
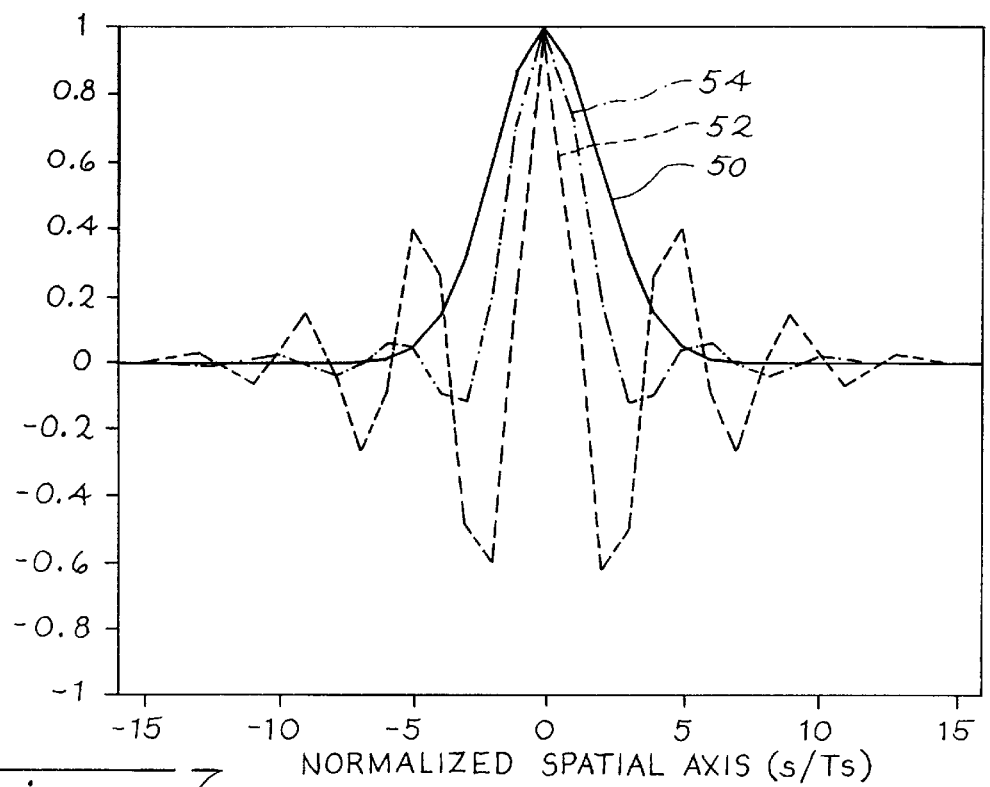
FIGS. 6 and 7 are graphs showing whitening filter spatial domain characteristics and whitening filter frequency domain characteristics, respectively.

Turning now to the drawings, FIG. 1 is a block diagram of an ultrasonic imaging system 10 that incorporates a preferred embodiment of this invention. The system 10 includes a transmit beamformer 12 that applies transmit waveforms via a multiplexer 14 to a phased array transducer 16. The transducer 16 generates acoustical signals in response to the transmit waveforms, and these acoustical signals are timed and phased to focus ultrasonic energy along one or more desired lines.

Echoes from the region being imaged are received by the transducer 16 and applied via the multiplexer 14 to a receive signal path 17. The receive signal path 17 includes a receive beamformer 18 that applies beamformed receive signals to a line-to-line phase adjuster 20. The phase adjuster 20 assures adequate coherence between adjacent acoustic lines to allow effective lateral interpolation prior to detection. The output of the phase adjuster 20 is applied to a whitening filter 22, and the whitened receive signal from the filter 22 is amplitude or envelope detected by a detector 24. The detected receive signal is then filtered with a low pass filter 26. The output of the low pass filter 26 is applied to conventional downstream processing such as a conventional image processor.

As shown in FIG. 1, pre-detection whitening is preferably applied after receive beamformation in this embodiment. Some beamformers generate analytic (complex) output signals that are demodulated down to baseband. The embodiment of FIG. 1 operates with the receive signals applied to the whitening filter 32 at baseband. However, the present invention is not limited to such embodiments. In alternative embodiments, receive signals at frequencies other than baseband (e.g. RF or IF receive signals) can be applied to the whitening filter. In this case, the whitening filter is preferably centered at the center frequency of the receive signal.

Successful axial filtering is sensitive to any mismatch between the center frequency of the whitening filter 22 (which is zero for analytic baseband receive signals) and the center frequency of the receive signal applied to the whitening filter. Preferably, the receive signal path 17 includes adaptive demodulators (not shown) to compensate for variations in the signal center frequency which result from frequency-dependent attenuation coefficients that can vary between patients and tissue types. Lateral filtering is generally less sensitive to any mismatch between the center frequency of the whitening filter and the center frequency of the receive signal applied to the whitening filter.

The whitening filter operates to increase the spatial bandwidth of the receive signal (as measured at the −6 dB points), both axially and laterally. In this way, the whitening filter 22 improves the detail resolution at the cost of increases in range lobe and side lobe levels. The whitening filter 22 also increases the number of independent speckles per unit area.

The post-detection low pass filter 26 is designed to reduce speckle variance and also to reduce the range and side lobe levels enhanced by the whitening filter 22. The level of smoothing provided by the low pass filter 26 can be adjusted to achieve the desired compromise between speckle reduction and enhanced spatial resolution.

The pre-detection and post-detection filters 22, 26 can take many forms including the following:

Three-dimensional filters operating along all three axes: azimuth (i.e. lateral), range (i.e. axial), and elevation;

Two-dimensional filters operating on any two of the three axes;

One-dimensional filters operating on any one of the three axes.

The filters 22, 26 can be separable or inseparable, or they can use any desired combination of separability. The filters 22, 26 can also be dependent upon the position in any one, any two, or all of three of the axes. For example, the filters 22, 26 can be range dependent, line or azimuthal position dependent, range and line dependent, and so forth.

The pre-detection whitening filter and the post-detection low-pass filter can be amplitude-dependent, and/or local statistics (e.g. amplitude variance) dependent.

The pre-detection whitening filter can be an inverse filter such as a Wiener filter and therefore complex, or it can be a simple, real and symmetric whitening filter. Preferably, the whitening filter is an inseparable inverse filter which is line dependent. However, line and range independent, real, symmetric, and separable two-dimensional filters can be an acceptable compromise for some embodiments, trading hardware/ software simplicity against optimum performance.

FIGS. 2–5 provide schematic illustrations of suitable filters for the whitening filter 22 and the low pass filter 26, including two and three-dimensional filters 30 (FIG. 2), one-dimensional lateral filters 32 (FIG. 3), one-dimensional axial filters 34 (FIG. 4), and inverse filters 36 (FIG. 5). For all of these filters, the filtering region can be shaped as desired, and can be circularly symmetric or elongated, depending upon the imaging system.

The imaging system 10 operates by whitening the ultrasonic receive signal with the filter 22, detecting the whitened receive signal with the detector 24, and then low pass filtering the detected receive signal with filter 26.

Figure 7:
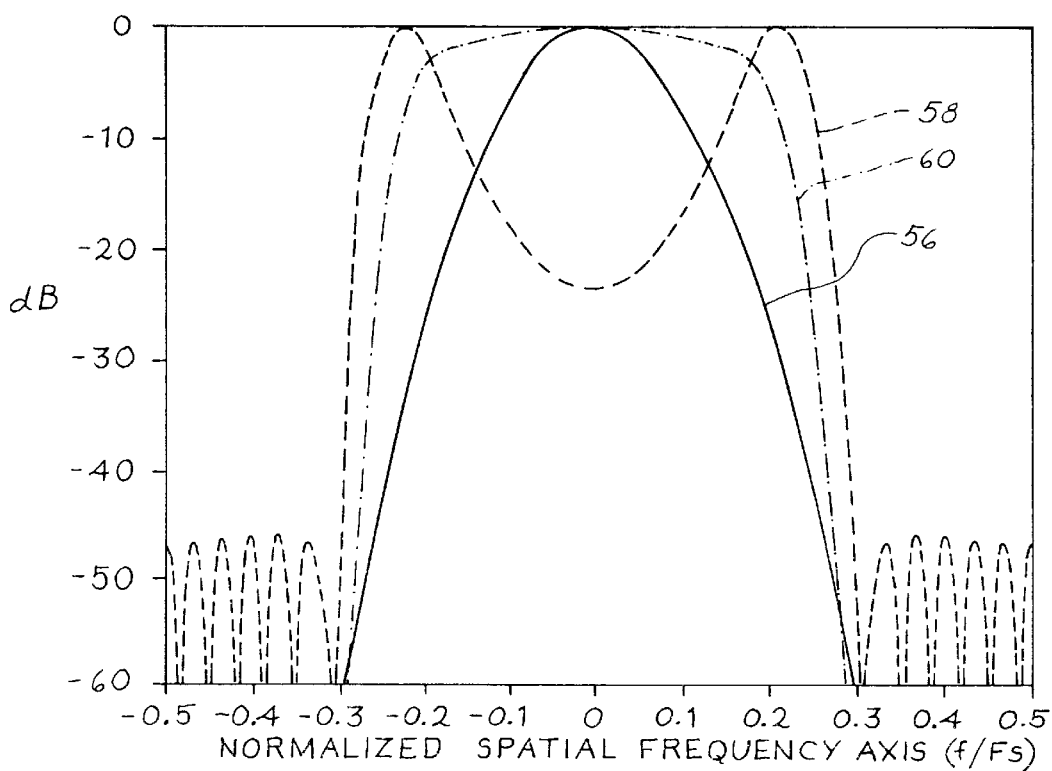

FIGS. 6 and 7 provide further information regarding a preferred whitening filter 22. FIG. 6 provides a spatial domain graph showing an input signal 50 to the filter 22, the filter impulse response 52 of the filter 22, and the resulting output 54 of the filter 22.

FIG. 7 is a frequency domain graph that illustrates the spatial frequency spectrum 56 of the input signal to the whitening filter 22, the whitening filter frequency response 58, and the spatial frequency spectrum 60 of the output signal from the whitening filter 22. Note that the spatial frequency output spectrum 60 exhibits a whitened spatial spectrum such that the bandwidth (as measured at the −6 dB points) is maximized and the passband has a relatively flat magnitude response. The maximum bandwidth achievable is ultimately limited by the transducer bandwidth, the center frequency, and the effective aperture size in azimuth and elevation. The signal to noise ratio may also be a limiting factor, because whitening causes a loss in the signal to noise ratio. Note however that the post-detection smoothing described above will help recover most of the loss in the signal to noise ratio, depending on how much of the detail resolution improvement provided by the whitening filter is retained.

In FIGS. 6 and 7, the input signal to the whitening filter 22 is assumed to have an envelope with a Gaussian shape. Note that the spatial frequency spectrum 60 of FIG. 7 has a RECT-like magnitude, and that the output spectrum 60 is much wider at the −6 dB points than the input spectrum 56.

Figure 8:
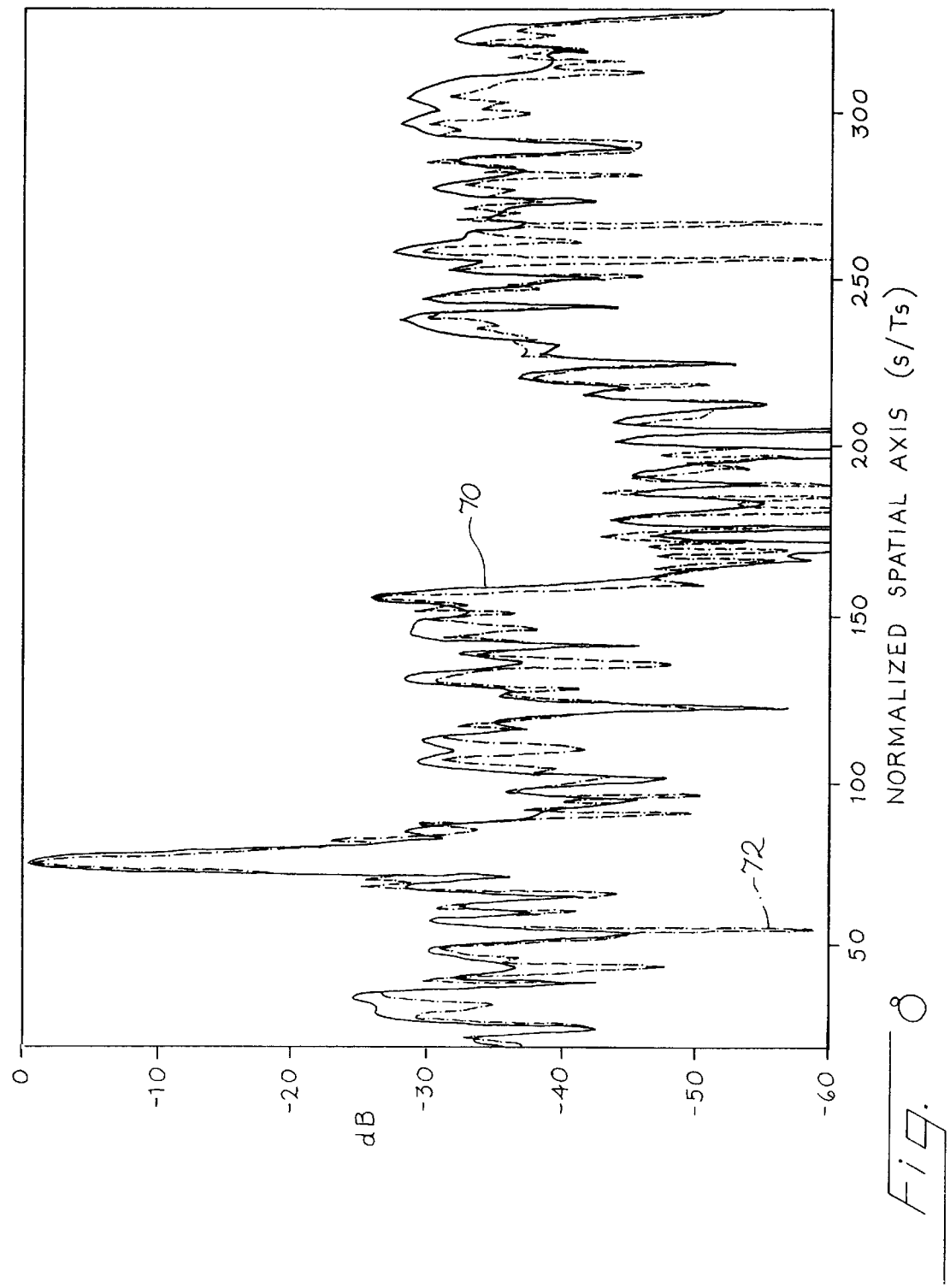
FIG. 8 is a graph showing the input and output of a pre-detection whitening filter, wherein the input signal is characteristic of a one-dimensional pin target and speckle.
Figure 9:
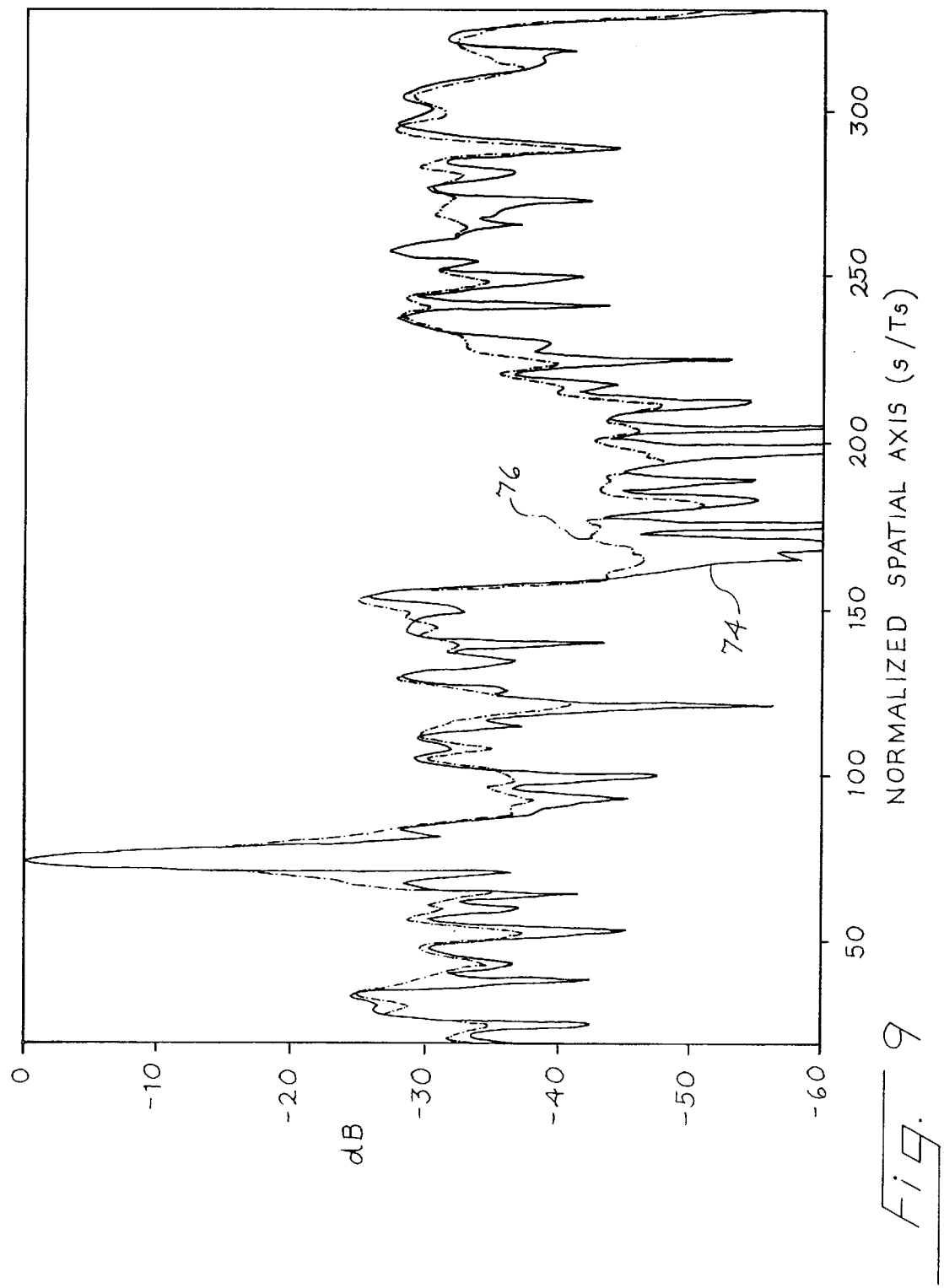
FIG. 9 is a graph showing the input to a pre-detection whitening filter and the corresponding output from a post-detection low pass filter.

FIGS. 8 and 9 are graphs that illustrate the effect of pre-detection whitening and post-detection smoothing on detail resolution and speckle variance. For these figures a simulated input signal for the whitening filter 22 was used. This simulated input signal was obtained from a one-dimensional simulated phantom that includes a hypoechoic lesion and a pin target. The solid curves 70, 74 of FIGS. 8 and 9 show this one-dimensional input signal, which may be thought to be taken from any acoustic line in a three-dimensional imaged region, assuming a Gaussian impulse response as shown in FIG. 6.

The dash-dot curve 72 of FIG. 8 is the output of the pre-detection whitening filter 22, prior to operation of the post-detection smoothing filter 26. The pin target response shows an improvement in detail resolution as well as an associated increase in range/side lobes. The average speckle length of the dash-dot curve 72 is about one-half the average speckle length of the solid curve 70.

As shown in FIG. 9, the output of the post-detection low pass filter 26 for the same simulation (the dot-dash curve 76) shows that the detail resolution has returned to the original detail resolution of the unfiltered image (down to the −15 dB points). However, speckle variance has been reduced significantly as compared to the original unfiltered image, making the simulated lesion more easily detected.

Figure 10:
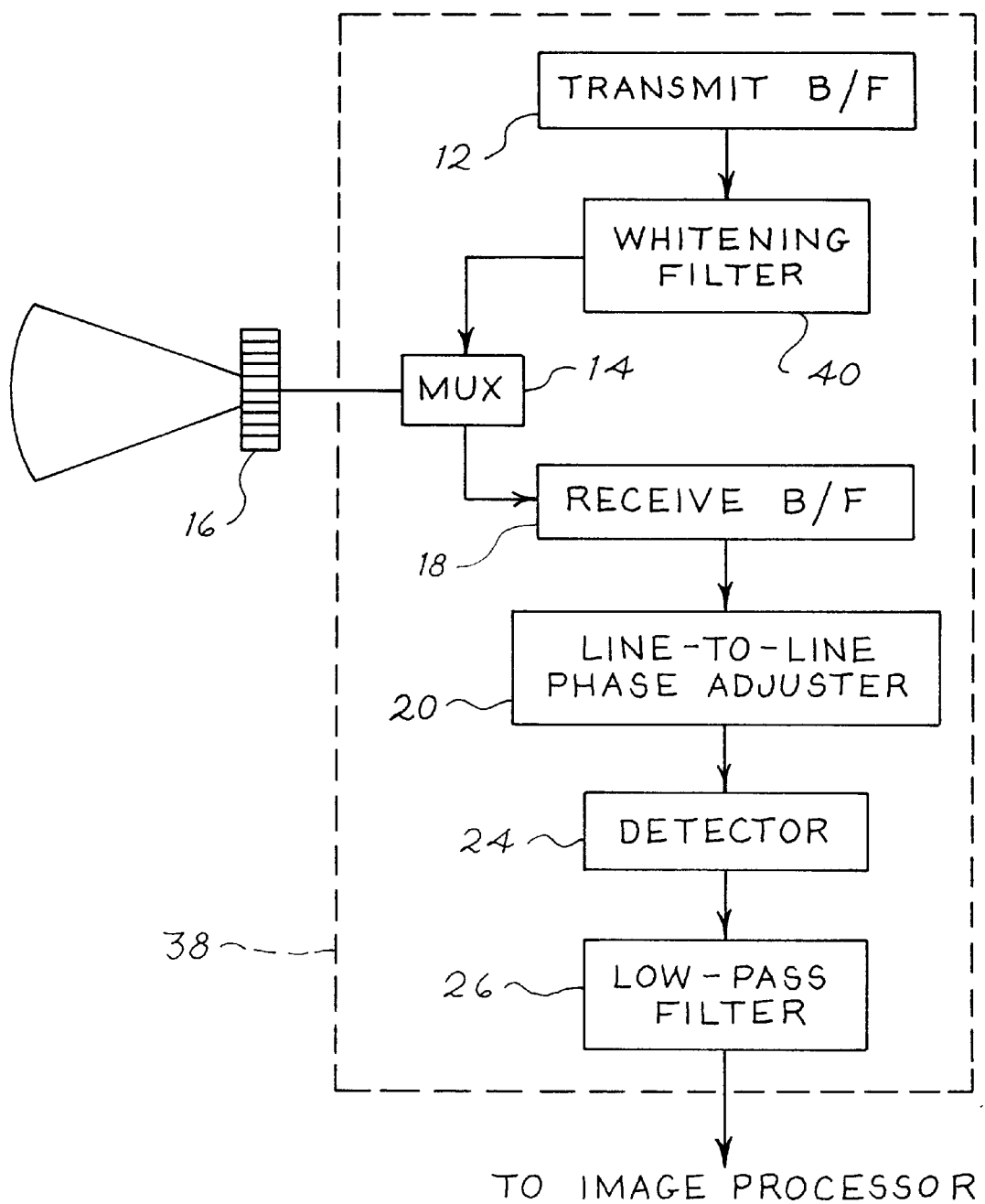
FIG. 10 is a block diagram of a second preferred embodiment of the ultrasonic imaging system of this invention.

It is not essential in all embodiments that the whitening filter be provided in the receive signal path. An alternate embodiment is shown in FIG. 10 in which the whitening filter 40 is included in the transmit/receive signal path 38, downstream of the transmit beamformer 12 and upstream of the multiplexer 14. In these embodiments it is the transmit ultrasonic signal that is designed to whiten the round-trip impulse response. The embodiment of FIG. 10 operates similarly to the embodiment of FIG. 1 discussed above, in that the receive signal applied to the detector 24 has a substantially RECT spectral shape. Other transmit pulse shaping techniques can be used to provide the desired whitening, and whitening techniques can be used both upstream and downstream of the transducer 16 in some embodiments.

It will be understood that the present invention can be adapted for use with the widest variety of ultrasonic imaging systems, including the widest variety of beamformers, detectors and filters. For example, the transmit and receive beamformers 12, 18 can be analog, digital, or hybrid beamformers. In some cases, the receive beamformer 18 may provide receive signals that are phased suitably such that the line to line phase adjuster 20 may be eliminated. The beamformers disclosed in U.S. Pat. Nos. 5,685,308 and 5,675,554 are suitable for use with this invention.

Whitening filters are well-known to those skilled in the art and can take analog or digital forms. Any suitable form can be used with this invention. Similarly, low pass filters such as the low pass filter 26 are well-known to those skilled in the art. Any suitable form including both analog and digital filters can be used with this invention. For example, a whitening filter may be an inverse, pseudo-inverse, or edge enhancement filter that fully or partially compensates for the transmitter, transducer, and receiver filter responses as well as for propagation effects such that the total round-trip impulse response of the imaging system has a substantially flat pass-band with a bandwidth at the −6 dB points that is as wide as possible.

As used herein the term "receive signal" is intended broadly to encompass any signal responsive to ultrasonic echoes along the receive signal path 17, which may in some embodiments include the image processor. Thus, the term "receive signal" may be applied to signals before or after beam-formation.

The terms "upstream" and "downstream" are intended broadly to cover the flow of information as it moves from the transmit beamformer 12 to the image processor. Thus, the whitening filters 22, 40 are upstream of the detector 24, and the low pass filter 26 is downstream of the detector 24.

The pre-detection whitening filter described here can also be applied to the input images of a multi-image technique, where multiple images are combined pre- or post-detection, e.g. compounding. For example images to be compounded can be whitened before detection and compounding, followed by low-pass filtering.

Finally, it will be understood that for ease of understanding the block diagram of FIG. 1 has been simplified. In many embodiments there will be intermediate processing steps at various stages along the signal path. Such intermediate processing may in some embodiments be found between the whitening filter 22 and the detector 24, as well as between the detector 24 and the low pass filter 26.

The foregoing detailed description has discussed only a few of the any forms of this invention can take. For this reason, it is intended that this detailed description be regarded as illustrative rather than limiting. It is only the following claims, including all equivalents, that are intended to define the scope of this invention.

What is claimed is:

1. In an ultrasonic imaging system comprising a receive signal path comprising a transmit beamformer, a receive beamformer and a detector, the improvement comprising:
   a whitening filter included in the signal path upstream of the detector and operative in at least one dimension selected from the group consisting of a lateral dimension and an elevation dimension; and
   a low-pass filter included in the signal path downstream of the detector and operative in said at least one dimension.

2. The invention of claim 1 wherein the receive beamformer is positioned in the signal path upstream of the whitening filter.

3. In an ultrasonic imaging system comprising a receive signal path comprising a transmit beamformer, a receive beamformer and a detector, the improvement comprising:
   a whitening filter included in the signal path upstream of the detector; and
   a low-pass filter included in the signal path downstream of the detector;
   wherein the receive beamformer is positioned in the signal path downstream of the whitening filter.

4. The invention of claim 1 wherein the whitening filter comprises a multi-dimensional whitening filter.

5. The invention of claim 1 wherein the low-pass filter comprises a multi-dimensional low-pass filter.

6. The invention of claim 1 wherein the whitening filter comprises a one-dimensional, axial whitening filter.

7. The invention of claim 1 wherein the whitening filter comprises a one-dimensional, lateral whitening filter.

8. The invention of claim 1 wherein the low-pass filter comprises a one-dimensional, axial, low-pass filter.

9. The invention of claim 1 wherein the low-pass filter comprises a one-dimensional, lateral, low-pass filter.

10. In an ultrasonic imaging system comprising a receive signal path comprising a transmit beamformer, a receive beamformer and a detector, the improvement comprising:
    a whitening filter included in the signal path upstream of the detector; and
    a low-pass filter included in the signal path downstream of the detector;
    wherein the whitening filter comprises an inverse whitening filter.

11. In an ultrasonic imaging system comprising a receive signal path comprising a transmit beamformer, a receive beamformer and a detector, the improvement comprising:
    a whitening filter included in the signal path upstream of the detector; and
    a low-pass filter included in the signal path downstream of the detector;
    wherein the whitening filter comprises a Wiener filter.

12. In an ultrasonic imaging system comprising a receive signal path comprising a transmit beamformer, a receive beamformer and a detector, the improvement comprising:
    a whitening filter included in the signal path upstream of the detector; and
    a low-pass filter included in the signal path downstream of the detector wherein the ultrasonic imaging system further comprises a transducer;
    wherein the whitening filter is positioned upstream of the transducer in the signal path.

13. A method for processing an ultrasonic receive signal in an ultrasonic imaging system, said method comprising:
    (a) whitening an ultrasonic receive signal in at least one dimension selected from the group consisting of a lateral dimension and an elevation dimension;
    (b) detecting the receive signal after (a);
    (c) low-pass filtering the detected receive signal in said at least one dimension after (b).

14. The method of claim 13 wherein step (a) comprises the step of shaping an ultrasonic transmit signal associated with the receive signal to whiten the receive signal.

15. The method of claim 13 wherein the receive signal of step (a) comprises a beamformed signal.

16. The method of claim 13 wherein step (a) comprises the step of applying the ultrasonic receive signal to a multi-dimensional whitening filter.

17. The method of claim 13 wherein step (c) comprises the step of applying the detected receive signal to a multi-dimensional low-pass filter.

18. The method of claim 13 wherein step (a) comprises the step of applying the ultrasonic receive signal to a one-dimensional, axial, whitening filter.

19. The method of claim 13 wherein step (a) comprises the step of applying the ultrasonic receive signal to a one-dimensional, lateral, whitening filter.

20. The method of claim 13 wherein step (c) comprises the step of applying the detected receive signal to a one-dimensional, axial, low-pass filter.

21. The method of claim 13 wherein step (c) comprises the step of applying the detected receive signal to a one-dimensional, lateral, low-pass filter.

22. The method of claim 13 wherein step (a) comprises the step of applying the ultrasonic receive signal to a inverse whitening filter.

23. A method for processing an ultrasonic receive signal in an ultrasonic imaging system, said method comprising:
    (a) whitening an ultrasonic receive signal;
    (b) detecting the receive signal after (a);
    (c) low-pass filtering the detected receive signal after (b);
    wherein (a) provides the receive signal with a spatial spectral shape that is substantially rectangular.

* * * * *